US011207861B2

(12) United States Patent
Miyabe et al.

(10) Patent No.: US 11,207,861 B2
(45) Date of Patent: Dec. 28, 2021

(54) INJECTION BLOW-MOLDED CONTAINER

(71) Applicant: Mitsubishi Gas Chemical Company, Inc., Tokyo (JP)

(72) Inventors: Takanori Miyabe, Kanagawa (JP); Tomonori Kato, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 126 days.

(21) Appl. No.: 16/607,044

(22) PCT Filed: Apr. 16, 2018

(86) PCT No.: PCT/JP2018/015695
§ 371 (c)(1),
(2) Date: Oct. 21, 2019

(87) PCT Pub. No.: WO2018/198855
PCT Pub. Date: Nov. 1, 2018

(65) Prior Publication Data
US 2020/0047392 A1    Feb. 13, 2020

(30) Foreign Application Priority Data
Apr. 28, 2017 (JP) .............................. JP2017-090678

(51) Int. Cl.
*B32B 1/02* (2006.01)
*B65D 1/00* (2006.01)
*B29C 49/06* (2006.01)
*B29C 49/22* (2006.01)
*B32B 27/34* (2006.01)
*C08L 77/00* (2006.01)
*B65D 1/02* (2006.01)
*B32B 27/36* (2006.01)

(52) U.S. Cl.
CPC ................ *B32B 1/02* (2013.01); *B29C 49/06* (2013.01); *B29C 49/22* (2013.01); *B32B 27/34* (2013.01); *B65D 1/00* (2013.01); *B65D 1/0207* (2013.01); *B65D 1/0215* (2013.01); *C08L 77/00* (2013.01); *B32B 27/36* (2013.01); *B32B 2439/60* (2013.01)

(58) Field of Classification Search
CPC B32B 1/02; B32B 27/34; B32B 27/36; B32B 2439/60; B29C 49/0005; B29C 49/06; B29C 49/22; B29C 49/221; B65D 1/00; B65D 1/0207; B65D 1/0215; C08L 77/00; C08L 77/02; C08L 77/06
See application file for complete search history.

(56) References Cited

U.S. PATENT DOCUMENTS 8,304,499 B2 * 11/2012 Shelby .................. C08L 67/02
525/425
2007/0154668 A1   7/2007 Rhee et al.

| | | | |
|---|---|---|---|
| 2010/0304164 | A1 | 12/2010 | Sato et al. |
| 2012/0082861 | A1 | 4/2012 | Sato et al. |
| 2012/0123041 | A1 | 5/2012 | Zaher et al. |
| 2012/0263962 | A1 | 10/2012 | Sato et al. |
| 2013/0219836 | A1 | 8/2013 | Sato et al. |
| 2016/0083581 | A1 | 3/2016 | Ishii et al. |

FOREIGN PATENT DOCUMENTS

| | | |
|---|---|---|
| CN | 101389709 A | 3/2009 |
| CN | 101522388 A | 9/2009 |
| CN | 102803344 A | 11/2012 |
| CN | 105102335 A | 11/2015 |
| EP | 2397300 A2 | 12/2011 |
| JP | H01-320159 A | 12/1989 |
| JP | 2001-252560 A | 9/2001 |
| JP | 2004-067238 A | 3/2004 |
| JP | 2015-214344 A | 12/2015 |
| JP | 2016-078373 A | 5/2016 |
| JP | 2016-145064 A | 8/2016 |
| JP | 2016-160382 A | 9/2016 |
| JP | 2016-169027 A | 9/2016 |
| RU | 2430939 C2 | 10/2011 |

OTHER PUBLICATIONS

International Search Report for PCT/JP2018/015695, dated Jun. 19, 2018, and English Translation submitted herewith (5 pages).
Li, Dongle, "Structure and Property of Flexible Plastic Packaging Materials," China Light Industry Press, Mar. 31, 2015 (13 pages). (partial translation).
Peng, Zhihan et al., "Handbook of Plastic Industry Polyamide," Chemical Industry Press, Nov. 30, 2021 (7 pages).

* cited by examiner

*Primary Examiner* — Walter Aughenbaugh
(74) *Attorney, Agent, or Firm* — Fitch, Even, Tabin & Flannery LLP

(57) ABSTRACT

An object of the present invention is to provide an injection blow container that is excellent in moldability and impact resistance and furthermore, excellent in solvent resistance. The injection blow-molded container of the present invention comprises 60 to 95 parts by mass of a polyamide resin (A) and 5 to 40 parts by mass of a polyamide resin (B) (per 100 parts by mass in total of the polyamide resin (A) and the polyamide resin (B)), wherein the polyamide resin (A) comprises a diamine-derived constitutional unit and a dicarboxylic acid-derived constitutional unit, wherein 70 mol % or more of the diamine-derived constitutional unit is a constitutional unit derived from xylylenediamine, 70 mol % or more of the dicarboxylic acid-derived constitutional unit is a constitutional unit derived from α,ω-linear aliphatic dicarboxylic acid having 4 to 12 carbon atoms, and 30 mol % or less thereof is a constitutional unit derived from isophthalic acid; and the polyamide resin (B) comprises no constitutional unit derived from xylylenediamine, and is a polyamide resin having an alkylene group having 5 to 12 carbon atoms.

13 Claims, No Drawings

INJECTION BLOW-MOLDED CONTAINER

CROSS-REFERENCE TO RELATED APPLICATIONS

This application is a U.S. national phase application filed under 35 U.S.C. § 371 of International Application Number PCT/JP2018/015695, filed Apr. 16, 2018, designating the United States, which claims priority from Japanese Application Number 2017-090678, filed Apr. 28, 2017.

FIELD OF THE INVENTION

The present invention relates to an injection blow-molded container.

BACKGROUND OF THE INVENTION

Polyamide resins are widely used, as engineering plastics that are excellent in mechanical strength such as impact resistance and abrasion resistance, and also excellent in heat resistance, in the fields of automobile parts, electronic and electric parts, office automation equipment parts, building material and housing-related parts, and the like. In recent years, their fields of use have been expanded.

PTL1 describes a multilayer container using poly(metaxylylene adipamide) as a gas barrier resin.

CITATION LIST

Patent Literature

PTL1: JP 2015-214344 A

SUMMARY OF INVENTION

As described in PTL1, polyamide resins having a constitutional unit derived from xylylenediamine and a constitutional unit derived from $\alpha,\omega$-linear aliphatic dicarboxylic acid, typified by poly(metaxylylene adipamide), have heretofore been used as gas barrier resins for forming gas barrier layers. However, there has been a demand for a container having much better moldability, impact resistance and solvent resistance.

An object of the present invention is to provide an injection blow container that is excellent in moldability and impact resistance and furthermore, excellent in solvent resistance.

The present invention has been made in light of these circumstances. The present inventors have conducted diligent studies to attain the object and consequently completed the present invention by finding that a container obtained by injection blow molding using a resin composition is excellent in moldability and impact resistance and furthermore, also excellent in solvent resistance, the resin composition containing, in specific ranges, a polyamide resin (A) in which 70 mol % or more of a diamine-derived constitutional unit is a constitutional unit derived from xylylenediamine, 70 mol % or more of a dicarboxylic acid-derived constitutional unit is a constitutional unit derived from $\alpha,\omega$-linear aliphatic dicarboxylic acid having 4 to 12 carbon atoms, and 30 mol % or less thereof is a constitutional unit derived from isophthalic acid, and a polyamide resin (B) comprising no constitutional unit derived from xylylenediamine, and having an alkylene group having 5 to 12 carbon atoms.

Specifically, the present invention relates to the following <1> to <14>:

<1> An injection blow-molded container comprising at least one layer comprising 60 to 95 parts by mass of a polyamide resin (A) and 5 to 40 parts by mass of a polyamide resin (B) (per 100 parts by mass in total of the polyamide resin (A) and the polyamide resin (B)), wherein the polyamide resin (A) comprises a diamine-derived constitutional unit and a dicarboxylic acid-derived constitutional unit, wherein 70 mol % or more of the diamine-derived constitutional unit is a constitutional unit derived from xylylenediamine, 70 mol % or more of the dicarboxylic acid-derived constitutional unit is a constitutional unit derived from $\alpha,\omega$-linear aliphatic dicarboxylic acid having 4 to 12 carbon atoms, and 30 mol % or less thereof is a constitutional unit derived from isophthalic acid; and the polyamide resin (B) comprises no constitutional unit derived from xylylenediamine, and is a polyamide resin having an alkylene group having 5 to 12 carbon atoms.

<2> The container according to <1>, wherein the container is a single-layer container.

<3> The container according to <1>, wherein the container is a two-layer container comprising the layer comprising 60 to 95 parts by mass of the polyamide resin (A) and 5 to 40 parts by mass of the polyamide resin (B), and further comprising an additional layer.

<4> The container according to any of <1> to <3>, wherein the $\alpha,\omega$-linear aliphatic dicarboxylic acid having 4 to 12 carbon atoms comprises adipic acid.

<5> The container according to any of <1> to <4>, wherein the xylylenediamine comprises metaxylylenediamine.

<6> The container according to any of <1> to <5>, wherein the polyamide resin (B) comprises at least one selected from the group consisting of polyamide 6, polyamide 66, polyamide 666, polyamide 11, polyamide 12, and polyamide 6I6T.

<7> The container according to any of <1> to <6>, wherein 80 to 95 parts by mass of the polyamide resin (A) are comprised per 100 parts by mass in total of the polyamide resin (A) and the polyamide resin (B).

<8> The container according to any of <1> to <7>, wherein 1 mol % or more of the dicarboxylic acid-derived constitutional unit in the polyamide resin (A) is a constitutional unit derived from isophthalic acid.

<9> The container according to any of <1> to <8>, wherein 3 to 10 mol % of the dicarboxylic acid-derived constitutional unit in the polyamide resin (A) is a constitutional unit derived from isophthalic acid.

<10> The container according to any of <1> to <9>, wherein when the glass transition temperature of the polyamide resin (A) is defined as Tg(A) (° C.) and the glass transition temperature of the polyamide resin (B) is defined as Tg(B) (° C.), the following expression (1) is satisfied:

$$Tg(A)-Tg(B) \geq 25 \tag{1}$$

<11> The container according to any of <1> to <10>, wherein the injection blow-molded container is obtained by a method of carrying out an injection step and a blow step in the same apparatus, and performing blow molding through the use of residual heat held in a preform at the time of the injection step.

<12> The container according to any of <1> to <11>, wherein the container retains a liquid comprising at least one organic compound selected from the group consisting of hydrocarbons, alcohols, esters, ketones, and ethers.

<13> The container according to any of <1> to <12>, wherein the average thickness of a container body is 0.4 mm or larger.

<14> The container according to any of <1> to <13>, wherein the rate of change in body dimension represented by the following expression (i) is less than 2%:

$$(A-B)/A \times 100 \qquad \text{Expression (i)}$$

wherein A represents the body dimension of the container immediately after retaining of toluene, and B represents the body dimension of the container retaining toluene after storage of the container in an atmosphere at 50° C. and 90% RH for 60 days.

The present invention can provide an injection blow container that is excellent in moldability and impact resistance and furthermore, excellent in solvent resistance.

DESCRIPTION OF EMBODIMENTS

Hereinafter, the present invention will be described in detail. In the description below, the phrase "A to B" which represents a numeric range means "A or more and B or less" (in the case of A<B) or "A or less and B or more" (in the case of A>B).

Injection Blow-Molded Container

The injection blow-molded container (hereinafter, also simply referred to as the "container") of the present invention comprises at least one layer comprising 60 to 95 parts by mass of a polyamide resin (A) and 5 to 40 parts by mass of a polyamide resin (B) (hereinafter, also referred to as a "layer (X)") (per 100 parts by mass in total of the polyamide resin (A) and the polyamide resin (B)), wherein the polyamide resin (A) comprises a diamine-derived constitutional unit (hereinafter, the "diamine-derived constitutional unit" is also simply referred to as a "diamine unit") and a dicarboxylic acid-derived constitutional unit (hereinafter, the "dicarboxylic acid-derived constitutional unit" is also simply referred to as a "dicarboxylic acid unit"), wherein 70 mol % or more of the diamine-derived constitutional unit is a constitutional unit derived from xylylenediamine, 70 mol % or more of the dicarboxylic acid-derived constitutional unit is a constitutional unit derived from α,ω-linear aliphatic dicarboxylic acid having 4 to 12 carbon atoms, and 30 mol % or less thereof is a constitutional unit derived from isophthalic acid; and the polyamide resin (B) comprises no constitutional unit derived from xylylenediamine, and is a polyamide resin having an alkylene group having 5 to 12 carbon atoms.

Specifically, the container of the present invention is a container obtained by the injection blow molding of a resin composition containing 60 to 95 parts by mass of the polyamide resin (A) and 5 to 40 parts by mass of the polyamide resin (B) (hereinafter, also referred to as a "polyamide-based resin composition") (per 100 parts by mass in total of the polyamide resin (A) and the polyamide resin (B)).

The present inventor has completed the present invention by finding that, when an injection blow-molded container is prepared using a resin composition containing the polyamide resin (A) and the polyamide resin (B) at a specific ratio, the container is excellent in moldability and impact resistance and furthermore, excellent in solvent resistance.

The reason why the effects described above are obtained is not clear, but is expected as described below. Specifically, the polyamide resin (A) has heretofore been known as a polyamide resin excellent in solvent resistance and the like. A container using the polyamide resin (A) alone cannot obtain sufficient impact resistance. The inventor has considered that the constitutional unit derived from xylylenediamine, carried by the polyamide resin (A), is effective for solvent resistance, but may be responsible for reduction in impact resistance, and found that a container excellent in impact resistance can be obtained by using the polyamide resin (A) in combination with a polyamide resin (B) containing no constitutional unit derived from xylylenediamine, and establishing a layer comprising the polyamide resin (A) and the polyamide resin (B) at a specific range.

A direct blow molding method requires preparing a resin composition into a cylindrical parison and requires extruding resins with an elevated temperature. Hence, the cylindrical resin composition extruded from a die probably causes a weld line at a portion where the resins merge. From the viewpoint of production, the extruded cylindrical hollow parison open at its both ends. For obtaining a blow-molded container from the parison, it is necessary that one of the ends should be a high-pressure air inlet port while the other end should be a portion where the cylindrical parison is fused (hereinafter, also referred to as a "pinch-off part"). In the container obtained by the direct blow molding method, reduction in impact resistance is observed in the pinch-off part or the weld line. However, in the case of adopting the injection blow molding method mentioned above, neither a pinch-off part nor a weld line is generated in the container. Therefore, the impact resistance of the resulting container is presumably improved drastically. Furthermore, the presence of a weld line is considered to lead to reduction in appearance or reduction in barrier properties. The present invention presumably improves these characteristics.

Hereinafter, each component will be described in detail.

<Polyamide Resin (A)>

The container of the present invention comprises at least one layer (X) comprising the polyamide resin (A) and the polyamide resin (B) mentioned later.

The polyamide resin (A) used in the present invention comprises a diamine-derived constitutional unit and a dicarboxylic acid-derived constitutional unit, wherein 70 mol % or more (70 to 100 mol %) of the diamine-derived constitutional unit is a constitutional unit derived from xylylenediamine, 70 mol % or more (70 to 100 mol %) of the dicarboxylic acid-derived constitutional unit is a constitutional unit derived from α,ω-linear aliphatic dicarboxylic acid having 4 to 12 carbon atoms, and 30 mol % or less (0 to 30 mol %) thereof is a constitutional unit derived from isophthalic acid (provided that the total does not exceed 100 mol %).

The diamine-derived constitutional unit (diamine unit) contains 70 mol % or more, preferably 80 mol % or more, more preferably 90 mol % or more, of the constitutional unit derived from xylylenediamine.

The constitutional unit derived from xylylenediamine can be any of a constitutional unit derived from metaxylylenediamine, a constitutional unit derived from paraxylylenediamine, and a constitutional unit derived from orthoxylylenediamine. One of these constitutional units may be used alone, or two or more thereof may be used in combination. Among them, the constitutional unit derived from xylylenediamine preferably contains at least one of a constitutional unit derived from metaxylylenediamine and a constitutional unit derived from paraxylylenediamine, and more preferably contains only a constitutional unit derived from metaxylylenediamine or contains both a constitutional unit derived from metaxylylenediamine and a constitutional unit derived from paraxylylenediamine.

The constitutional unit derived from xylylenediamine preferably contains 0 to 70 mol % of the constitutional unit derived from paraxylylenediamine and 30 to 100 mol % of the constitutional unit derived from metaxylylenediamine, and more preferably contains 0 to 50 mol % of the constitutional unit derived from paraxylylenediamine and 50 to 100 mol % of the constitutional unit derived from metaxylylenediamine, per 100 mol % of the constitutional unit derived from xylylenediamine.

Examples of the diamine, other than xylylenediamine, which can be used can include, but are not limited to, 1,3-bis(aminomethyl)cyclohexane, 1,4-bis(aminomethyl)cyclohexane, tetramethylenediamine, hexamethylenediamine, nonamethylenediamine, and 2-methyl-1,5-pentanediamine.

The polyamide resin (A) comprises the dicarboxylic acid-derived constitutional unit (dicarboxylic acid unit). 70 mol % or more of the dicarboxylic acid-derived constitutional unit is a constitutional unit derived from $\alpha,\omega$-linear aliphatic dicarboxylic acid having 4 to 12 carbon atoms, and 30 mol % or less thereof is a constitutional unit derived from isophthalic acid (provided that the total does not exceed 100 mol %).

The dicarboxylic acid unit constituting the polyamide resin (A) contains 70 mol % or more, preferably 80 mol % or more, more preferably 90 mol % or more, still more preferably 92 mol % or more, of the $\alpha,\omega$-linear aliphatic dicarboxylic acid having 4 to 12 carbon atoms, from the viewpoint of improving moldability and solvent resistance. The upper limit is not particularly limited and is 100 mol % or less, preferably 99 mol % or less, more preferably 97 mol % or less, still more preferably 96 mol % or less.

Examples of the $\alpha,\omega$-linear aliphatic dicarboxylic acid having 4 to 12 carbon atoms include suberic acid, adipic acid, azelaic acid, sebacic acid, and dodecanoic acid. Adipic acid and sebacic acid are preferred, and adipic acid is more preferred, from the viewpoint of moldability and solvent resistance.

The dicarboxylic acid unit constituting the polyamide resin (A) contains 30 mol % or less (0 to 30 mol %) of the constitutional unit derived from isophthalic acid, from the viewpoint of improving moldability and impact resistance. The content of the constitutional unit derived from isophthalic acid is preferably 1 to 20 mol %, more preferably 3 to 10 mol %, still more preferably 4 to 8 mol %, of the dicarboxylic acid unit.

Examples of the dicarboxylic acid unit other than $\alpha,\omega$-linear aliphatic dicarboxylic acid having 4 to 12 carbon atoms and isophthalic acid can include, but are not limited to, alicyclic dicarboxylic acids such as 1,3-cyclohexanedicarboxylic acid and 1,4-cyclohexanedicarboxylic acid; and aromatic dicarboxylic acids such as terephthalic acid, orthophthalic acid, and naphthalenedicarboxylic acid.

The total content of the constitutional units derived from $\alpha,\omega$-linear aliphatic dicarboxylic acid having 4 to 12 carbon atoms and isophthalic acid is preferably 80 mol % or more, more preferably 90 mol % or more, still more preferably 98 mol % or more, further preferably 100 mol %, of the whole dicarboxylic acid unit.

In addition to the diamine unit and the dicarboxylic acid unit mentioned above, copolymer units of lactams such as ε-caprolactam and laurolactam, aliphatic aminocarboxylic acids such as aminocaproic acid and aminoundecanoic acid, aromatic aminocarboxylic acids such as p-aminomethylbenzoic acid, and the like can be used as units constituting the polyamide resin (A), without impairing the effects of the present invention.

The polyamide resin (A) is produced by a melt polycondensation method (melt polymerization method). An exemplary method involves raising the temperature of a nylon salt consisting of diamine and dicarboxylic acid under increased pressure in the presence of water, and polymerizing the nylon salt in a melt state while removing added water and water from condensation reaction. Alternatively, the polyamide resin (A) is also produced by a method of adding diamine to dicarboxylic acid in a melt state, followed by polycondensation. In this case, in order to keep a uniform liquid state of the reaction system, diamine is continuously added to dicarboxylic acid. In the meantime, polycondensation is allowed to proceed while the temperature of the reaction system is raised such that the reaction temperature does not fall below the melting points of the resulting oligoamide and polyamide.

In order to obtain an effect of accelerating amidation reaction or an effect of preventing coloration at the time of polycondensation, a phosphorus atom-containing compound may be added into the polycondensation system for the polyamide resin (A).

Examples of the phosphorus atom-containing compound include dimethylphosphinic acid, phenylmethylphosphinic acid, hypophosphorous acid, sodium hypophosphite, potassium hypophosphite, lithium hypophosphite, calcium hypophosphite, ethyl hypophosphite, phenylphosphinic acid, sodium phenylphosphinate, potassium phenylphosphinate, lithium phenylphosphinate, ethyl phenylphosphinate, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, phosphorous acid, sodium hydrogenphosphite, sodium phosphite, triethyl phosphite, triphenyl phosphite and pyrophosphorous acid. Among them, in particular, hypophosphorous acid metal salts such as sodium hypophosphite, potassium hypophosphite, lithium hypophosphite and calcium hypophosphite are preferably used because these compounds have the high effect of accelerating amidation reaction but also excellent in the effect of preventing coloration, and sodium hypophosphite is especially preferred. The phosphorus atom-containing compound that can be used in the present invention is not limited to these compounds.

The addition amount of the phosphorus atom-containing compound which is added into the polycondensation system for the polyamide resin (A) is preferably 1 to 500 ppm, more preferably 5 to 450 ppm, still more preferably 10 to 400 ppm, as expressed in terms of a phosphorus atom concentration in the polyamide resin (A) from the viewpoint of preventing coloration of the polyamide resin (A) during the polycondensation.

It is preferred to add an alkali metal compound or an alkaline earth metal compound in combination with the phosphorus atom-containing compound into the polycondensation system for the polyamide resin (A). For preventing coloration of the polyamide resin (A) during the polycondensation, it is necessary to allow a sufficient amount of the phosphorus atom-containing compound to exist. Also for the purpose of regulating an amidation reaction rate, it is preferred to allow an alkali metal compound or an alkaline earth metal compound to coexist.

Examples thereof include hydroxides of an alkali metal/alkaline earth metal such as lithium hydroxide, sodium hydroxide, potassium hydroxide, rubidium hydroxide, cesium hydroxide, magnesium hydroxide, calcium hydroxide and barium hydroxide; acetates of an alkali metal/alkaline earth metal such as lithium acetate, sodium acetate, potassium acetate, rubidium acetate, cesium acetate, magnesium acetate, calcium acetate and barium acetate. Any of other alkali metal compounds or alkaline earth metal compounds can be used without limitations. Among them, a hydroxide of an alkali metal or an acetate of an alkali metal is preferred.

In the case of adding the alkali metal compound or alkaline earth metal compound into the polycondensation system for the polyamide resin (A), a value obtained by dividing the molar number of the said compound by the molar number of the phosphorus atom-containing compound is preferably 0.5 to 2.0, more preferably 0.6 to 1.8, still more preferably 0.7 to 1.5. By allowing the addition amount of the alkali metal compound or alkaline earth metal compound to fall within the aforementioned range, it becomes possible to inhibit formation of a gel while obtaining the effect of accelerating amidation reaction due to the phosphorus atom-containing compound.

The polyamide resin (A) obtained through melt polycondensation is once taken out, then pelletized, and then dried for use. Also, for the purpose of further increasing a degree of polymerization, solid phase polymerization may be performed. As a heating apparatus which is used for drying or solid phase polymerization, a continuous-type heat drying apparatus, a rotary drum type heating apparatus called a tumble dryer, a conical dryer or a rotary dryer, or a cone type heating apparatus equipped with a rotary blade in the inside thereof, called a Nauta mixer, may be suitably used; however, the method and the apparatus are not limited thereto, and known methods and known apparatuses may be used. In particular, in the case of performing solid phase polymerization of the polyamide, among the aforementioned apparatuses, the rotary drum type heating apparatus is preferably used in view of the matter that not only the system may be hermetically sealed, but also the polycondensation is readily advanced in a state where oxygen causing the coloration has been removed.

A relative viscosity is generally used as to the degree of polymerization of the polyamide resin (A) used in the present invention. The relative viscosity (relative viscosity measured with 96% by mass of concentrated sulfuric acid as a solvent under conditions involving a temperature of 25° C. and a concentration of 0.2 g/20 mL) of the polyamide resin (A) is preferably 1.5 to 4.2, more preferably 1.7 to 4.0, still more preferably 2.0 to 3.8, from the viewpoint of moldability.

The relative viscosity refers to a ratio of a fall time (t) measured at 25° C. in a Cannon-Fenske viscometer to a fall time (to) of 96% by mass sulfuric acid itself measured in the same manner and is expressed according to the following expression:

Relative viscosity=$t/t_0$

The melting point of the polyamide resin (A) is preferably 180 to 280° C., more preferably 200 to 260° C., still more preferably 220 to 240° C. The melting point of the polyamide resin (A) that falls within the aforementioned range is preferred because such a polyamide resin (A) is excellent in compatibility with the polyamide resin (B) and as a result, has favorable impact resistance and solvent resistance.

<Polyamide Resin (B)>

The container of the present invention comprises at least one layer (X) comprising the polyamide resin (A) mentioned above and the polyamide resin (B). The polyamide resin (B) comprises no constitutional unit derived from xylylenediamine, and is a polyamide resin having an alkylene group having 5 to 12 carbon atoms. The polyamide resin (B) contained therein improves impact resistance.

Examples of the polyamide resin (B) include aliphatic polyamides and semi-aromatic polyamides.

Examples of the aliphatic polyamide that comprises no constitutional unit derived from metaxylylenediamine and has an alkylene group having 5 to 12 carbon atoms include polyamide 6 (also known as nylon 6), polyamide 66 (also known as nylon 66), polyamide 666 (copolymer of polyamide 6 and polyamide 66; also known as nylon 666), polyamide 10 (also known as nylon 10), polyamide 11 (also known as nylon 11), polyamide 12 (also known as nylon 12), polyamide 46 (also known as nylon 46), polyamide 610 (also known as nylon 610), and polyamide 612 (also known as nylon 612). The aliphatic polyamide is preferably used as the polyamide resin (B) because the difference in glass transition temperature from the polyamide resin (A) mentioned later is easily obtained and a container excellent in drop impact resistance can be obtained by imparting flexibility.

Example of the semi-aromatic polyamide that comprises no constitutional unit derived from metaxylylenediamine and has an alkylene group having 5 to 12 carbon atoms include polyamide 6T (also known as nylon 6T; polyhexamethylene terephthalamide), polyamide 6I (also known as nylon 6I; polyhexamethylene isophthalamide), and polyamide 6I6T (also known as nylon 6I6T; polyhexamethylene terephthalamide/polyhexamethylene isophthalamide). The semi-aromatic polyamide is preferably used as the polyamide resin (B) because a container improved in drop impact resistance is obtained by imparting flexibility and container moldability is improved by delaying crystallization.

Among them, the polyamide resin (B) is preferably polyamide 6, polyamide 66, polyamide 666, polyamide 11, polyamide 12, or polyamide 6I6T, more preferably polyamide 6, polyamide 66, polyamide 666, or polyamide 12, still more preferably polyamide 6, polyamide 66, or polyamide 666, further preferably polyamide 6 or polyamide 666, especially preferably polyamide 666, from the viewpoint of improvement in impact resistance.

When the glass transition temperature of the polyamide resin (A) is defined as Tg(A) (° C.) and the glass transition temperature of the polyamide resin (B) is defined as Tg(B) (° C.), the following expression (1) is preferably satisfied:

$$Tg(A)-Tg(B) \geq 25 \qquad (1)$$

The difference between Tg(A) and Tg(B) by 25° C. or more is preferred because moldability is much better.

Tg(A)–Tg(B) is more preferably 27° C. or more, still more preferably 30° C. or more, further preferably 35° C. or more. The upper limit thereof is not particularly limited and is preferably 100° C. or less, more preferably 70° C. or less, from the viewpoint of easy availability, etc.

In the present invention, Tg(A)–Tg(B)≥25° C. is preferred because the polyamide resin (B) relaxes stress generated in the polyamide resin (A) at the time of molding and after molding, and thereby improves drop impact resistance.

In this context, the glass transition temperature Tg(A) of the polyamide resin (A) is preferably 70 to 150° C., more preferably 75 to 130° C., still more preferably 80 to 110° C., from the viewpoint of the moldability and dimensional stability of the container.

The glass transition temperature Tg(B) of the polyamide resin (B) is preferably 20 to 120° C., more preferably 25 to 80° C., still more preferably 30 to 60° C., further preferably 40 to 55° C., from the viewpoint of the impact resistance of the container.

<Blending Ratio>

The polyamide-based resin composition used in the present invention contains 60 to 95 parts by mass of the polyamide resin (A) and 5 to 40 parts by mass of the polyamide resin (B) per 100 parts by mass in total of the polyamide resin (A) and the polyamide resin (B).

The content of the polyamide resin (A) is preferably 70 parts by mass or more, more preferably 80 parts by mass or more, still more preferably 85 parts by mass or more, and is preferably 92 parts by mass or less.

The content of the polyamide resin (B) is preferably 8 parts by mass or more, and is preferably 30 parts by mass or less, more preferably 20 parts by mass or less, still more preferably 15 parts by mass or less.

By allowing the contents of the polyamide resin (A) and the polyamide resin (B) to fall within the aforementioned ranges based on the total content of the polyamide resin (A) and the polyamide resin (B), the resulting container is excellent in moldability and impact resistance and furthermore, also excellent in solvent resistance.

The polyamide-based resin composition used in the present invention may contain an additional resin component, in addition to the polyamide resin (A) and the polyamide resin (B). The content of the additional resin component is preferably 30% by mass or less, more preferably 20% by mass or less, still more preferably 10% by mass or less, of the whole resin components. Further preferably, the polyamide-based resin composition contains no such additional resin component.

Examples of the additional resin component include polyamide resins other than the polyamide resin (A) and the polyamide resin (B), polyphenylene ether resins, styrene resins, polycarbonate resins, acrylic resins, polyester resins, polyphenylene sulfide resins, liquid crystal polyester resins, polyacetal resins, and modified or unmodified elastomers such as styrene-ethylene-butylene-styrene copolymers (SEBS) and styrene-ethylene-propylene-styrene copolymers (SEPS). Alternatively, the polyamide-based resin composition may contain a thermosetting resin such as a phenol resin, a melamine resin, a silicone resin, or an epoxy resin.

<Additive>

In the present invention, an additive such as a lubricant, a nucleating agent, a matting agent, a heat resistant stabilizer, a weather resistant stabilizer, an ultraviolet absorbent, a plasticizer, a mold release agent, a flame retardant, an antistatic agent, a coloration preventing agent, an antioxidant, an elastomer, an inorganic pigment, an organic pigment, a dispersant, an inorganic pigment master batch, an organic pigment master batch, a recycling aid, a terminal functional group reactant, or a thickener can be added into the polyamide-based resin composition according to the moldability of the polyamide-based resin composition and performance required for the container. These additives can be added according to the need without impairing the effects of the present invention.

<Method for Preparing Polyamide-Based Resin Composition>

In the present invention, the method for preparing the polyamide-based resin composition is not particularly limited. The desired polyamide-based resin composition can be obtained, for example, by melt-kneading the polyamide resin (A) and the polyamide resin (B) in an extruder. In this respect, the components of the polyamide-based resin composition may be mixed and melt-kneaded at the same time, or in order to enhance the kneading dispersibility of a component having a small content ratio, a master batch of the components may be prepared in advance and then melt-kneaded to produce the polyamide-based resin composition.

Specifically, the polyamide resin (A), the polyamide resin (B), and optionally, other components such as a terminal functional group reactant, a recycling aid, and a colorant may be melt-kneaded in advance to prepare a master batch, which is then melt-kneaded with the polyamide resin (A). Alternatively, the polyamide resin (A) and other components may be melt-kneaded to prepare a master batch, which is then melt-kneaded with the polyamide resin (A) and the polyamide resin (B), though the preparation method is not particularly limited.

The master batch and the polyamide resin (A) may be mixed in advance by a dry blend system and then melt-kneaded. Alternatively, the master batch and the polyamide resin (A) may be dry-blended, and the obtained dry-blend product is directly charged in a molding machine such as an injection molding machine.

Furthermore, the master batch and the polyamide resin (A) may be weighed into a feeder and then directly molded in a molding machine such as an injection molding machine.

Moreover, the master batch and the polyamide resin (A) may be dry-blended and then melt-kneaded to obtain pellets of the polyamide-based resin composition, which are then molded.

The set temperature of a cylinder at the time of melt kneading is preferably 210 to 280° C., more preferably 220 to 270° C., still more preferably 230 to 260° C.

The melt kneading time is not particularly limited and is preferably 1 second to 5 minutes, more preferably 3 seconds to 4 minutes, still more preferably 5 seconds to 3 minutes.

Examples of the apparatus for use in melt kneading include, but are not particularly limited to, open-type mixing rolls, non-open-type Banbury mixers, kneaders, and continuous kneading machines (single-screw kneading machines, twin-screw kneading machines, multi-screw kneading machines, etc.).

<Injection Blow-Molded Container>

The container of the present invention is obtained by injection blow molding using the polyamide-based resin composition. The container of the present invention is preferably a hollow container. Also, the container of the present invention comprises at least one layer (X) obtained using the polyamide-based resin composition. The container of the present invention is preferably a two-layer container comprising the layer (X) and further comprising an additional layer, or a single-layer container consisting only of the layer (X), more preferably a single-layer container consisting only of the layer (X), still more preferably a single-layer hollow container.

When the container of the present invention is a two-layer container, examples of the additional layer include, but are not particularly limited to, layers made of a polyolefin resin.

The capacity of the container of the present invention is preferably 2 mL to 3 L, more preferably 5 mL to 1 L, still more preferably 8 mL to 500 mL, especially preferably 10 mL to 100 mL.

The average thickness of the body of the container of the present invention is preferably 0.1 mm or larger, more preferably 0.3 mm or larger, sill more preferably 0.4 mm or larger, further preferably 0.5 mm or larger, especially preferably 0.8 mm or larger. Also, the average thickness of the body is preferably 3 mm or smaller, more preferably 2 mm or smaller, still more preferably 1.5 mm or smaller. The average thickness of the body of the container that falls within the aforementioned range is preferred because the resulting container is excellent in impact resistance and solvent resistance and has light weight.

The shape of the container of the present invention is not particularly limited. A hollow container is preferred, and various shapes such as a bottle shape, a cup shape, a tray shape, and a tank shape can be adopted. Among them, a bottle shape or a tank shape is preferred, and a bottle shape is more preferred. The present invention provides a container superior in impact resistance and solvent resistance to a conventional container, in particular, a conventional bottle-shaped container, prepared by the direct blow method. Therefore, the container of the present invention is especially suitable as a bottle-shaped container.

Examples of the article to be retained include, but are not particularly limited to, fuels such as gasoline, kerosene, and gas oil; lubricating oils such as engine oil and brake oil; various toiletry products such as bleaches and detergents; various cosmetics such as shampoos, rinses, and lotions; chemicals such as ethanol and oxydol; various organic chemicals such as agrichemicals, perm solutions, fragrances, and bath agents; various beverages such as vegetable juices and milk beverages; and other various articles such as seasonings and edible oils.

Among them, the container of the present invention preferably retains a liquid containing an organic compound, more preferably retains a liquid containing at least one organic compound selected from the group consisting of hydrocarbons, alcohols, esters, ketones, and ethers, and sill more preferably retains an organic solvent selected from the group consisting of hydrocarbons, alcohols, esters, ketones, and ethers.

Examples of the hydrocarbons include saturated hydrocarbon solvents such as hexane, pentane, 2-ethylhexane, heptane, octane, decane, cyclohexane, methylcyclohexane, IP SOLVENT 1016 (manufactured by Idemitsu Kosan Co., Ltd.), and IP SOLVENT 1620 (manufactured by Idemitsu Kosan Co., Ltd.); unsaturated hydrocarbon solvents such as hexene, heptene, and cyclohexene; aromatic hydrocarbon solvents such as toluene, xylene, ethylbenzene, decalin, 1,2,3,4-tetrahydronaphthalene, IPSOL 100 (manufactured by Idemitsu Kosan Co., Ltd.), and IPSOL 150 (manufactured by Idemitsu Kosan Co., Ltd.); and halogenated hydrocarbon solvents such as dichloromethane and chlorobenzene.

Examples of the alcohols include methanol, ethanol, n-propyl alcohol, isopropyl alcohol, butanol, isobutyl alcohol, isopentyl alcohol, cyclohexanol, methylcyclohexanol, ethylene glycol, diethylene glycol, triethylene glycol, polyethylene glycol, propylene glycol, dipropylene glycol, tripropylene glycol, polypropylene glycol, propanediol, butanediol, pentanediol, hexylene glycol, and 2-methyl-2,4-pentanediol.

Examples of the esters include methyl acetate, ethyl acetate, propyl acetate, butyl acetate, and pentyl acetate.

Examples of the ketones include acetone, methyl ethyl ketone, cyclohexanone, methyl isobutyl ketone, methyl cyclohexanone, and methyl-n-butyl ketone.

Examples of the ethers include dimethyl ether, diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether, anisole, and phenetole.

Among them, the container of the present invention preferably retains a liquid containing at least one organic compound selected from the group consisting of hexane, heptane, xylene, toluene, ethylbenzene, butyl acetate, ethyl acetate, isopropyl alcohol, and butyl alcohol, and more preferably retains a liquid containing at least one organic compound selected from the group consisting of xylene, toluene, and butyl acetate.

The container of the present invention is prevented from being deformed due to the organic compound retained in the container and can thus be effectively utilized as a container having high storage stability.

In the container of the present invention, the rate of change in body dimension represented by the following expression (i) is preferably less than 2%:

$$(A-B)/A \times 100 \qquad \text{Expression (i)}$$

wherein A represents the body dimension of the container immediately after retaining of toluene, and B represents the body dimension of the container retaining toluene after storage of the container in an atmosphere at 50° C. and 90% RH for 60 days.

As for the body dimension, outside dimensions in the following 4 directions are measured. Specifically, when a line connecting two points on the parting line of a blow mold of the container is defined as a reference line (direction 1), three lines (directions 2, 3, and 4) can be drawn by clockwise rotation by 45 degrees from the reference line so as to pass through the center of the body of the container. The outside dimension in each direction was measured by measuring the distances between the respective intersection points of these four lines and the container. The smallest value of the obtained outside dimensions was used as the body dimension of the container.

The rate of change in body dimension is preferably less than 2%, more preferably 1.4% or less, still more preferably 1.0% or less.

When the rate of change in body dimension falls within the aforementioned range, the resulting container is excellent in solvent resistance and is prevented from being deformed.

<Injection Blow Molding>

The injection blow-molded container of the present invention is produced by injection blow molding. In the injection blow molding, first, a test tube-like preform (parison) is molded by injection molding and then blown into, for example, the form of a bottle, through the use of residual heat of the preform at the time of injection. In order to stabilize the temperature of the preform, a temperature control zone such as a reheating heater pod or a temperature control pod may be established, if necessary. Specifically, the preform is set in a mold with a final shape (blow mold) while the state heated to some extent is kept. The preform can be blown and closely attached to the mold by blowing air from the mouth portion, followed by cooling and solidifying, thereby molding into, for example, the form of a bottle. This approach may be used in combination with a stretching rod according to the shape or required physical properties of the container.

Usually, an injection molding method can be applied to the molding of the parison.

In the present invention, using a molding machine equipped with an injection device, and an injection mold, the polyamide-based resin composition containing the polyamide resin (A) and the polyamide resin (B) can be injected from the injection cylinder into the cavity through the hot runners of the mold to produce a parison according to the shape of the injection mold.

The mold with a final shape mentioned above is heated, and upon blowing, the outer surface of the container wall of the molded article is made in contact with the inner surface of the mold for a prescribed period of time.

The injection blow-molded container of the present invention is preferably obtained by a hot parison molding method. In this context, the hot parison molding method is a method of carrying out an injection step and a blow step in the same apparatus, and performing blow molding through the use of residual heat held in a preform at the time of the injection step. On the other hand, a cold parison molding method involves cooling a molded preform to room temperature, followed by reheating from room temperature to the same temperature before blow as the hot parison molding method.

As another method for producing a blow molded article, two-stage blow molding may be adopted, in which the preform is molded with a primary stretching blow mold into a primary blow molded article having a larger dimension than the final blow molded article, and subsequently, the primary blow molded article is shrunk under heating, and then subjected to stretching blow molding with a secondary mold, thereby providing the final blow molded article. According to this method for producing a blow molded article, the bottom portion of the blow molded article can be sufficiently stretched and thinned, thereby providing a blow molded article that is excellent in hot charging, is prevented from being deformed at its bottom portion upon heat sterilization, and is excellent in impact resistance.

The container of the present invention may be coated with a vapor deposited film of an inorganic material or an inorganic oxide, or an amorphous carbon film.

Examples of the inorganic material and the inorganic oxide include aluminum, alumina and silicon oxide. The vapor deposited film of an inorganic material or an inorganic oxide may block elution or penetration of organic compounds, such as acetaldehyde and formaldehyde, from the container of the present invention. The formation method of the vapor deposited film is not particularly limited, and examples thereof include a physical vapor deposition method, such as a vacuum vapor deposition method, a sputtering method and an ion plating method, and a chemical vapor deposited method, such as PECVD. The thickness of the vapor deposition film is preferably from 5 to 500 nm, and more preferably from 5 to 200 nm, from the standpoint of the gas barrier property, the light shielding property and the flexural resistance.

The amorphous carbon film is a diamond-like carbon film, and is a hard carbon film, which may be referred to as an i-carbon film or a hydrogenated amorphous carbon film. Examples of the formation method of the film include a method, in which an interior of a hollow molded article is evacuated to make vacuum, to which a carbon source gas is fed, and energy for forming plasma is fed thereto to make plasma of the carbon source gas. According to the method, the amorphous carbon film can be formed on the inner surface of the container. The amorphous carbon film not only considerably can decrease the permeability to low molecular weight inorganic gas, such as oxygen and carbon dioxide, but also suppress sorption of various low molecular weight organic compounds having odor. The thickness of the amorphous carbon film is preferably from 50 to 5,000 nm from the standpoint of the sorption suppressing effect to low molecular weight organic compounds, the enhancing effect of the gas barrier property, the adhesion to plastics, the durability, the transparency and the like.

EXAMPLES

Hereinafter, the present invention will be described in more detail with reference to Examples. However, the present invention is not limited to these Examples. In the present invention, measurement for evaluation was performed by the following methods.

(1) Relative Viscosity of Polyamide Resin 0.2 g of a polyamide resin was precisely weighed and completely dissolved in 20 mL of 96% by mass sulfuric acid at 20 to 30° C. under stirring. After completely dissolved, 5 mL of the solution was quickly taken into a Cannon-Fenske type viscometer, which was then allowed to stand in a thermostat chamber at 25° C. for 10 minutes, and thereafter, a fall time (t) was measured. In addition, a fall time ($t_0$) of the 96% by mass sulfuric acid itself was measured in the same manner. The relative viscosity was calculated from these values of t and $t_0$ according to the following expression.

$$\text{Relative viscosity} = t/t_0$$

(2) Measurement of Glass Transition Temperature and Melting Point

Using a differential scanning calorimeter (manufactured by Shimadzu Corporation, trade name: DSC-60), the DSC measurement (differential scanning calorimetry measurement) was performed in a nitrogen gas stream at a temperature rise rate of 10° C./min to determine the glass transition temperature (Tg) and the melting point (Tm).

(3) Evaluation of Blow Moldability of Container

The blow moldability of a container was evaluated according to the following evaluation criteria.
A: The blow moldability is favorable (a container shape is made, and surface appearance is also excellent)
B: The blow moldability is fair (a container shape is made, but surface appearance is poor)
C: The blow moldability is poor (some portions or some samples fail to make a container shape)
D: The blow moldability is markedly poor (a container shape cannot be made)
Samples rated as C or D were not subjected to (4) Evaluation of rate of change in body dimension and (5) Evaluation of drop impact resistance of container mentioned later.

(4) Evaluation of Rate of Change in Body Dimension

Toluene was placed in a container prepared in each of Examples and Comparative Examples, up to 80% of the container capacity (24 ml for a 30 ml container). Then, a cap made of a polypropylene resin was attached to the mouth opening to prepare a container retaining a liquid for storage.
The body dimension of the container retaining a liquid for storage was measured immediately after the retaining of toluene.
Subsequently, the container retaining a liquid for storage was stored in a thermo-hygrostat chamber at 50° C. and 90% RH for 60 days. The container retaining a liquid for storage was taken out of the thermo-hygrostat chamber and cooled to room temperature, and the body dimension of the container retaining a liquid for storage was measured after the storage.
As for the body dimension, outside dimensions at a position of 35 mm in height from the bottom of the container were measured using digital vernier calipers (manufactured by Mitutoyo Corporation, trade name: ABS Digimatic Caliper CD-AX/APX). More specifically, when a line connecting two points on the parting line of a blow mold of the container was defined as a reference line (direction 1), three lines (directions 2, 3, and 4) were drawn by clockwise rotation by 45 degrees from the reference line so as to pass through the center of the body of the container. The outside dimension in each direction was measured by measuring the distances between the respective intersection points of these four lines and the container. The smallest value of the obtained outside dimensions was used as the body dimension of the container.

The rate of change in body dimension is represented by the following expression (i).

Rate of change in body dimension=$(A-B)/A \times 100$   Expression (i)

In the expression (i), A represents the body dimension of the container immediately after the retaining of toluene, and B represents the body dimension of the container after the storage.

The evaluation criteria are as follows. A to C are an acceptable range.
A: The rate of change in body dimension is 1% or less
B: The rate of change in body dimension is more than 1% and 1.4% or less
C: The rate of change in body dimension is more than 1.4% and less than 2%
D: The rate of change in body dimension is 2% or more (5) Evaluation of Drop Impact Resistance of Container Tap water was charged in an amount of 80% of the capacity in a container prepared in each of Examples and Comparative Examples. The container was closed with a cap made of polypropylene resin, and cooled for 2 hours in a refrigerator at 5° C. Subsequently, the container was dropped by free fall in a two direction from the bottom and from the side toward a concrete floor from a height of 80 cm.

The container was repetitively dropped until a crack was found. The number of drops was limited to a total of 10 (5 in each direction).

The evaluation criteria are as follows.
A: The number of drops at which a crack was found was 7 or more
B: The number of drops at which a crack was found was 3 or more and 6 or less
C: The number of drops at which a crack was found was 2 or less Resin Used <Polyamide Resin (A)>
A-1
Poly(metaxylylene adipamide), manufactured by Mitsubishi Gas Chemical Co., Inc., trade name: MX nylon S6121, relative viscosity=3.5, glass transition temperature=85° C., melting point=237° C.
A-2
Isophthalic acid-copolymerized poly(metaxylylene adipamide): prepared by the following method.
In a 3 L jacketed reaction vessel equipped with a stirrer, a partial condenser, a total condenser, a dropping tank, and a nitrogen introducing pipe, 4.70 mol of adipic acid (AA) and 0.30 mol of isophthalic acid (IPA) were weighed and charged. After thoroughly purging with nitrogen, the raw materials were melted under stirring and mixing at 160° C. in a nitrogen gas stream of a small amount to prepare slurry. To this slurry, 4.97 mol of metaxylylenediamine (MXDA) was dropped under stirring over 160 minutes. In the meantime, the inside temperature was continuously elevated to 250° C. Water distillates along with the dropping of metaxylylenediamine were removed from the system through the partial condenser and the total condenser. After the completion of dropping of metaxylylenediamine, the internal temperature was raised to 260° C., and the reaction was continued for 1 hour. Strands of the obtained polymer were taken out of the nozzle located at the bottom part of the reaction vessel, cooled in water, and then cut into a pellet shape to obtain polyamide resin pellets having an adipic acid:isophthalic acid molar ratio of 94:6.

Subsequently, the pellets were charged in a stainless steel-made rotary drum type heating apparatus, and the heating apparatus was rotated at 5 rpm. The reaction system was thoroughly purged with nitrogen, and the temperature within the reaction system was raised from room temperature to 140° C. in a nitrogen gas stream of a small amount. At the point of time when the temperature within the reaction system reached 140° C., the pressure was reduced to 1 torr (133.322 Pa) or less, and furthermore, the temperature within the system was raised to 190° C. over 130 minutes. After the temperature within the reaction system reached 190° C., a solid phase polymerization reaction was continued at the same temperature for 30 minutes.

After the completion of the reaction, the pressure reduction was terminated, and the temperature within the reaction system was decreased in a nitrogen gas stream. At the point of time of reaching 60° C., the pellets were taken out to obtain a polyamide resin (A-2). The polyamide resin (A-2) had a relative viscosity of 2.68, a glass transition temperature of 92° C., and a melting point of 229° C.
<Polyamide Resin (B)>
B-1
Polyamide 666, manufactured by DSM, trade name: Novamid 2030FC, glass transition temperature=50° C., melting point=199° C.
B-2
Polyamide 12, manufactured by Ube Industries, Ltd., product name: UBESTA 3030U, glass transition temperature=50° C., melting point=178° C.
B-3
Polyamide 6, manufactured by Ube Industries, Ltd., trade name: UBE Nylon 1022B, glass transition temperature=48° C., melting point=225° C.

Examples 1 to 24 and Comparative Examples 1 to 17

Production of Container

The polyamide resin (A) and the polyamide resin (B) were weighed at each blending ratio shown in Tables 1 and 2, and then dry-blended. The blended materials were charged in the hopper of an injection blow molding machine. A necessary amount of the melted resins was injected from the resin injection cylinder so that the injection mold was filled therewith to obtain a single-layer preform (10 g). The temperature of the obtained preform was controlled to a prescribed temperature. Then, the preform was transferred to a blow mold and performed blow molding as secondary processing to produce a single-layer container (total length: 95 mm, outer diameter: 22 mmϕ, average thickness of the body: 1.0 mm). An injection blow integration type molding machine was used which was composed of a preform injection molding zone having an injection cylinder and an injection mold, and a blow molding zone having a temperature control unit and a blow mold.

Molding Conditions for Container

Injection cylinder temperature: 260° C.
Injection mold resin flow path temperature: 265° C.
Parison surface temperature after injection molding: 130° C.
Parison temperature before blow: 125° C.
Blow mold cooling water temperature: 35° C.

By contrast, as for the hollow containers of Comparative Examples 1 to 17, a container cannot be stably obtained due to insufficient moldability in Comparative Examples involving a large content of the polyamide resin (B). On the other hand, the containers of Comparative Examples involving a small content of the polyamide resin (B) had poor drop impact resistance.

INDUSTRIAL APPLICABILITY

The container obtained in the present invention is excellent in moldability and impact resistance and furthermore,

TABLE 1

| Type of resin | Glass transition temperature (°C) | Unit | Example 1 | 2 | 3 | 4 | Comparative Example 1 | 2 | 3 | 4 | Example 5 | 6 | 7 | 8 | Comparative Example 5 | 6 | 7 | Example 9 | 10 | 11 | 12 | Comparative Example 8 | 9 | 10 |
|---|---|---|---|---|---|---|---|---|---|---|---|---|---|---|---|---|---|---|---|---|---|---|---|---|
| Polyamide resin (A-1) Isophthalic acid 0 mol % | 85 | wt % | 95 | 90 | 85 | 65 | 100 | 97 | 55 | 0 | 95 | 90 | 85 | 65 | 97 | 55 | 0 | 95 | 90 | 85 | 65 | 97 | 55 | 0 |
| Polyamide resin (B-1) | 50 | wt % | 5 | 10 | 15 | 35 | 0 | 3 | 45 | 100 | | | | | | | | | | | | | | |
| Polyamide resin (B-2) | 50 | wt % | | | | | | | | | 5 | 10 | 15 | 35 | 3 | 45 | 100 | | | | | | | |
| Polyamide resin (B-3) | 48 | wt % | | | | | | | | | | | | | | | | 5 | 10 | 15 | 35 | 3 | 45 | 100 |
| Difference in glass transition temperature | | °C. | 35 | 35 | 35 | 35 | — | 35 | 35 | — | 35 | 35 | 35 | 35 | 35 | 35 | — | 37 | 37 | 37 | 37 | 37 | 37 | — |
| Blow moldability of container | | — | B | B | B | B | B | B | C | D | B | B | B | B | B | C | D | B | B | B | B | B | C | D |
| Drop impact resistance of container | | — | B | A | A | A | C | C | — | — | B | A | A | C | — | — | — | B | A | A | C | — | — | — |
| Rate of change in body dimension | | % | A | A | A | B | A | A | — | — | A | A | A | B | A | — | — | A | A | B | C | A | — | — | excellent in solvent resistance and as such, can be utilized as

TABLE 2

| Type of resin | Glass transition temperature (°C) | Unit | Example 13 | 14 | 15 | 16 | Comparative Example 11 | 12 | 13 | Example 17 | 18 | 19 | 20 | Comparative Example 14 | 15 | Example 21 | 22 | 23 | 24 | Comparative Example 16 | 17 |
|---|---|---|---|---|---|---|---|---|---|---|---|---|---|---|---|---|---|---|---|---|---|
| Polyamide resin (A-2) Isophthalic acid 6 mol % | 92 | wt % | 95 | 90 | 85 | 65 | 100 | 97 | 55 | 95 | 90 | 85 | 65 | 97 | 55 | 95 | 90 | 85 | 65 | 97 | 55 |
| Polyamide resin (B-1) | 50 | wt % | 5 | 10 | 15 | 35 | 0 | 3 | 45 | | | | | | | | | | | | |
| Polyamide resin (B-2) | 50 | wt % | | | | | | | | 5 | 10 | 15 | 35 | 3 | 45 | | | | | | |
| Polyamide resin (B-3) | 48 | wt % | | | | | | | | | | | | | | 5 | 10 | 15 | 35 | 3 | 45 |
| Difference in glass transition temperature | | °C. | 42 | 42 | 42 | 42 | — | 42 | 42 | 42 | 42 | 42 | 42 | 42 | 42 | 44 | 44 | 44 | 44 | 44 | 44 |
| Blow moldability of container | | — | A | A | A | B | A | A | C | A | A | A | B | A | C | A | A | A | B | A | C |
| Drop impact resistance of container | | — | B | A | A | A | C | C | — | B | A | A | A | C | — | B | A | A | A | C | — |
| Rate of change in body dimension | | % | A | A | A | B | A | A | — | A | A | A | B | A | — | A | A | B | C | A | — |

According to Tables 1 and 2, the containers obtained in Examples 1 to 24 which satisfied the requirements of the present invention were excellent in blow moldability, excellent in drop impact resistance, and also excellent in solvent resistance with a small rate of change in body dimension even when retaining toluene.

a container that retains various organic compounds and compositions containing these organic compounds.

The invention claimed is:
1. An injection blow-molded container comprising
at least one layer comprising 60 to 95 parts by mass of a polyamide resin (A) and 5 to 40 parts by mass of a polyamide resin (B) (per 100 parts by mass in total of the polyamide resin (A) and the polyamide resin (B)), wherein the polyamide resin (A) comprises a diamine-derived constitutional unit and a dicarboxylic acid-derived constitutional unit, wherein 70 mol % or more of the diamine-derived constitutional unit is a constitutional unit derived from xylylenediamine, 70 mol % or more of the dicarboxylic acid-derived constitutional unit is a constitutional unit derived from am-linear aliphatic dicarboxylic acid having 4 to 12 carbon atoms, and 30 mol % or less thereof is a constitutional unit derived from isophthalic acid; and the polyamide resin (B) comprises no constitutional unit derived from xylylenediamine, and is a polyamide resin having an alkylene group having 5 to 12 carbon atoms, wherein 1 mol % or more of the dicarboxylic acid-derived constitutional unit in the polyamide resin (A) is a constitutional unit derived from isophthalic acid.

2. The container according to claim 1, wherein the container is a single-layer container.

3. The container according to claim 1, wherein the container is a two-layer container comprising the layer comprising 60 to 95 parts by mass of the polyamide resin (A) and 5 to 40 parts by mass of the polyamide resin (B), and further comprising an additional layer.

4. The container according to claim 1, wherein the am-linear aliphatic dicarboxylic acid having 4 to 12 carbon atoms comprises adipic acid.

5. The container according to claim 1, wherein the xylylenediamine comprises metaxylylenediamine.

6. The container according to claim 1, wherein the polyamide resin (B) comprises at least one selected from the group consisting of polyamide 6, polyamide 66, polyamide 666, polyamide 11, polyamide 12, and polyamide 6I6T.

7. The container according to claim 1, wherein 80 to 95 parts by mass of the polyamide resin (A) are comprised per 100 parts by mass in total of the polyamide resin (A) and the polyamide resin (B).

8. The container according to claim 1, wherein 3 to 10 mol % of the dicarboxylic acid-derived constitutional unit in the polyamide resin (A) is a constitutional unit derived from isophthalic acid.

9. The container according to claim 1, wherein when the glass transition temperature of the polyamide resin (A) is defined as Tg(A) (° C.) and the glass transition temperature of the polyamide resin (B) is defined as Tg(B) (° C.), the following expression (1) is satisfied:

$$Tg(A)-Tg(B) \geq 25 \qquad (1).$$

10. The container according to claim 1, wherein the injection blow-molded container is obtained by a method of carrying out an injection step and a blow step in the same apparatus, and performing blow molding through the use of residual heat held in a preform at the time of the injection step.

11. The container according to claim 1, wherein the container retains a liquid comprising at least one organic compound selected from the group consisting of hydrocarbons, alcohols, esters, ketones, and ethers.

12. The container according to claim 1, wherein the average thickness of a container body is 0.4 mm or larger.

13. The container according to claim 1, wherein the rate of change in body dimension represented by the following expression(i) is less than 2%:

$$(A-B)/A \times 100 \qquad \text{Expression (i)}$$

wherein A represents the body dimension of the container immediately after retaining of toluene, and B represents the body dimension of the container retaining toluene after storage of the container in an atmosphere at 50° C. and 90% RH for 60 days.

* * * * *

UNITED STATES PATENT AND TRADEMARK OFFICE
CERTIFICATE OF CORRECTION

PATENT NO. : 11,207,861 B2
APPLICATION NO. : 16/607044
DATED : December 28, 2021
INVENTOR(S) : Miyabe et al.

Page 1 of 1

It is certified that error appears in the above-identified patent and that said Letters Patent is hereby corrected as shown below:

On the Title Page

In item (56) "References Cited," under the section entitled "Other Publications," please delete "2021" and insert -- 2001 --, therefor.

In the Claims

Column 19, Line (10):
In Claim 1, please delete "am-linear" and insert -- $\alpha,\omega$-linear --, therefor.

Column 19, Lines (28-29):
In Claim 4, please delete "am-linear" and insert -- $\alpha,\omega$-linear --, therefor.

Column 20, Line (29):
In Claim 13, please delete "expression(i)" and insert -- expression (i) --, therefor.

Signed and Sealed this
Twenty-eighth Day of June, 2022

Katherine Kelly Vidal
*Director of the United States Patent and Trademark Office*